UNITED STATES PATENT OFFICE.

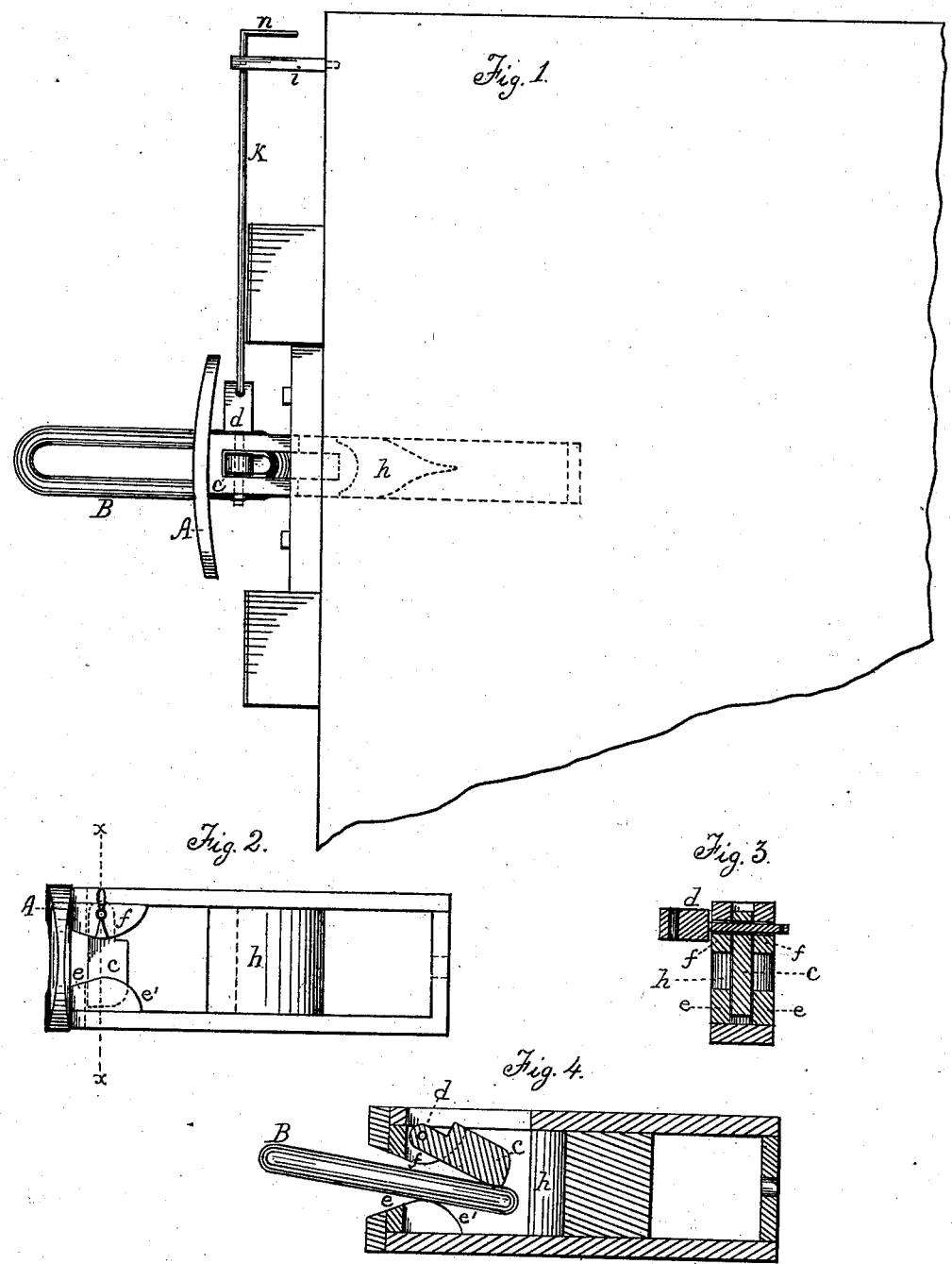

JOHN McGEEHON, OF FORT WAYNE, INDIANA.

IMPROVEMENT IN CAR-COUPLINGS.

Specification forming part of Letters Patent No. 201,812, dated March 26, 1878; application filed February 19, 1878.

*To all whom it may concern:*

Be it known that I, JOHN McGEEHON, of Fort Wayne, in the county of Allen and State of Indiana, have invented a new and useful Improvement in Car-Couplings, which is fully set forth in the following specification and accompanying drawing, in which—

Figure 1 is a plan view of coupler attached to the end of car. Fig. 2 is a side elevation of draw-head and coupler. Fig. 3 is a cross-section through line $xx$ in Fig. 2. Fig. 4 is a vertical longitudinal section of Fig. 2.

My invention relates to that class of car-couplers that have a dog swinging in the upper part of draw-head, which is pushed back and up as the link enters, and, when the link has entered far enough, falls by its own gravity, serving in place of the ordinary pin.

My invention will first be described in connection with the accompanying drawing, to which reference is hereto made, and then pointed out in claim.

A represents the draw-head; B, the link; c, the gravitating-dog keyed to the bolt $d$, from which it swings.

The entrance to draw-head may be of any of the ordinary shapes deemed best to facilitate the ready entrance of the link.

My draw-head is provided, just inside of the entrance and on the lower side, with guides e, which slope up and back from the front and round off on the inner ends, as shown at $e'$. Similar guides $f$ are arranged on the upper side and over the lower ones. The gravitating-dog c swings down between the guides, as shown; and when the strain of the draft or of the jerking of the cars is brought to bear on the dog, it does not try the bolt $d$, for it has a solid rest both above and below.

h is a stop placed in the back of the chamber of the draw-head, and has its front side hollowed or concaved to receive the round end of the link.

An important object gained by making the lower guides e gradually sloping up and back to correspond with the slope given the front entrance of draw-head, and then abruptly rounding off, as shown at $e'$, is that the link may be balanced on these guides, its inner end being placed under the dog c; and in this position, and by the dog being slightly raised or depressed, the inner end of link is correspondingly raised or lowered, thus lowering or elevating the outer end of link and holding it to enter the draw-head of another car, of a different height to that to which the link is attached.

To make this advantage available, and to avoid the necessity of a person standing between the cars to couple, I place a stud, $i$, near the side of the car, through which a rod, $k$, passes, and connects with the head of bolt $d$. The end of the rod is bent at right angles to afford a crank-arm, n, by grasping which the gravity-dog c may be raised to uncouple or to balance the link and hold it so that the outer end will couple with another draw-head automatically.

While no great deviation is made from the form or size of draw-heads now commonly used, (a radical change in which I have sought to avoid,) I claim that my assemblage and arrangement of sloping guides above and below, and of gravitating-dog keyed to the bolt, to which latter the rod is fastened and passed through the stud located near the outer side of car, give advantages that are desirable.

It will be seen my device will couple automatically, and may be uncoupled without the necessity of any one going between the cars, thereby avoiding a frequent cause of accidents.

Having described my invention, I claim and desire to secure by Letters Patent—

The combination, with the draw-head, of guides e on the lower side, sloping up and back from entrance, with the inner ends $e'$ rounding off, as shown, and guides $f$ on the upper side, and the gravity-dog, arranged to swing down between the guides, and keyed to the bolt $d$, to which the rod $k$ connects and extends to the side of the car, being supported by a stud or otherwise, as set forth.

JOHN McGEEHON.

Witnesses:
J. W. CLARK,
J. C. CRAIG.